United States Patent Office 3,385,391
Patented May 28, 1968

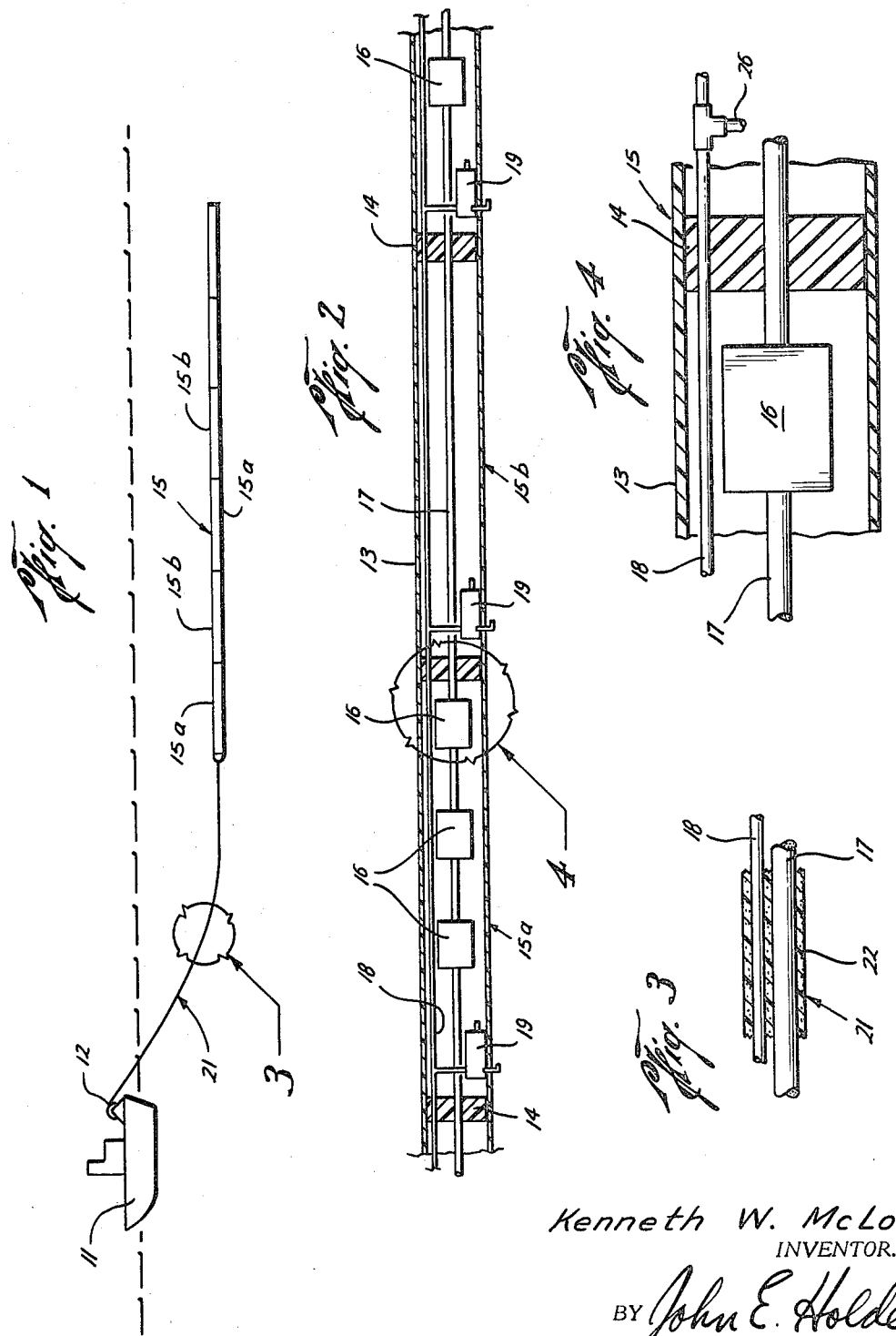

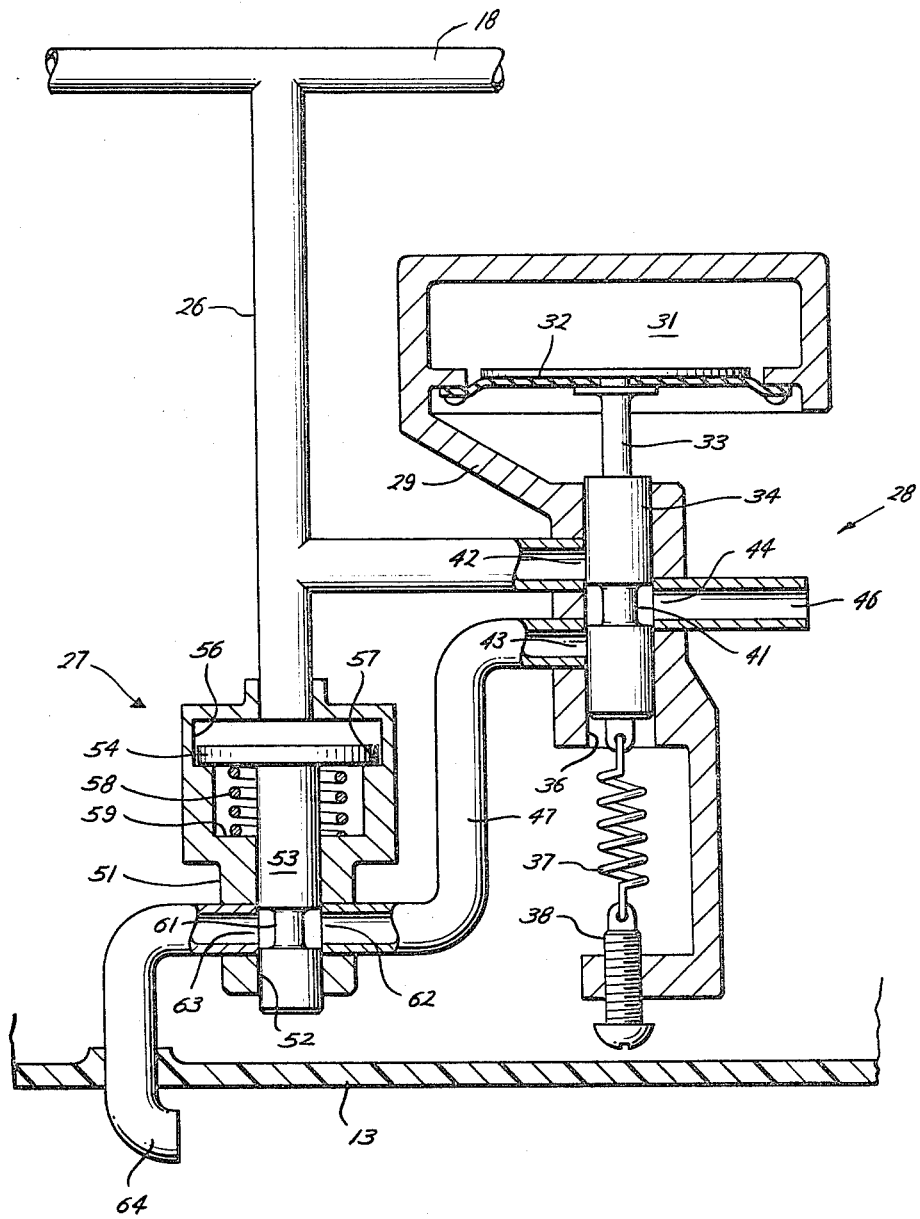

3,385,391
METHODS AND APPARATUS FOR CONTROLLING
DEPTH OF MARINE SEISMIC CABLE
Kenneth W. McLoad, Houston, Tex., assignor to Schlumberger Technology Corporation, Houston, Tex., a corporation of Texas
Filed Aug. 24, 1966, Ser. No. 574,595
4 Claims. (Cl. 181—.5)

ABSTRACT OF THE DISCLOSURE

The particular embodiment disclosed herein as illustrative of one form of the invention is a marine seismic cable system provided with buoyancy control to maintain the cable at predetermined depth. Pressure operated control valves are positioned in separate sections throughout the length of the cable and function to admit or expel a buoyancy regulating fluid from each of the separate sections.

This invention relates to a depth control system for cables and, more particularly, to an automatic depth control system for marine seismic cable.

One method of seismic prospecting in water covered areas is by the use of a neutral buoyant cable. The cable may be in the form of a cylindrical tube, 2000 to 10,000 feet in length, and made of a flexible, impervious material. Spacers within the tube are used to divide the tube into separate compartments which are filled with a fluid to maintain the cable at a neutral buoyancy in sea water. Conductors are provided in the cable which are attached to acoustic pressure sensors. The conductors are connected at their other ends with a recording system on board a boat for recording the seismic signals from the sensors. Such an assembly may commonly have twenty-four or more seismic information channels for detecting and conveying the signals representing seismic reflections to recording instruments aboard the boat. The boat also tows the long assembly from point to point through the water during the process of surveying an area.

A number of problems arise in conjunction with the operation of a marine seismic cable of this type. For example, it is critically important during towing that all points along the length of a seismic cable be maintained at a uniform depth within the water. The optimum depth of towing is determined, at least in part, by the wave length of reflected seismic signals and is normally maintained between twenty and fifty feet. In any event, the depth at which the seismic array is towed is selected by the survey operator. Normally, a neutrally buoyant cable as described above is divided into a number of joined sections and may, for example, have twenty-four or forty-eight isolated sections with a certain amount of buoyant fluid introduced into each section. The amount of fluid which is introduced into each section is varied in order to precisely adjust the density of that section to coincide with the density of the water where the survey is being conducted. When the entire length of cable has been adjusted with sufficient precision as to its density, each portion of the long assembly will follow all previous sections at the depth at which the foremost section is towed. The requirement for precision in adjusting the sections of cable increases with the length of the cable assembly being towed.

There are a number of factors, however, which affect the precise adjustment of the density of the cable system and thereby affect the capability of maintaining the system at a uniform depth. For example, small leaks in the assembly cause the buoyant fluid within the cable to escape and thereby affect the density of one or more sections affected by the leaks. Changes of temperature or changes in salinity of the water such as may be experienced near mouths of rivers will also affect the density of the water. Various means have been employed to stabilize the operating depth of such assemblies, however, for the most part these methods have been expensive, time consuming and many times ineffective.

It is, therefore, an object of the present invention to provide a new and improved depth control system for a cable which involves the continuous and automatic adjustment of the buoyancy of the cable.

With this and other objects in view, the present invention contemplates a cable system for towing from a boat and, more particularly, a cable system having conductors and a small flexible tube extending from the towing fittings aboard the boat to the rearmost portion of the cable assembly. A supply of buoyant fluid aboard the boat is transferable through the flexible tube by means of pumping or the like at an elevated pressure to isolated sections of the cable system. At intervals, such as at each of these sections, an automatic valve is provided to add or remove fluid from that section. The automatic valve is sensitive to hydrostatic pressure changes which, in turn, are dependent upon the depth of the section within the water.

The novel features of the invention are set forth with particularity in the appended claims. A complete understanding of the invention may be had by reference to the following detailed description when read in conjunction with the accompanying drawings illustrating an embodiment thereof, wherein:

FIGURE 1 shows a cable system extending behind a boat;

FIGURE 2 shows schematically the arrangement of the parts of a seismic cable system embodying features of the present invention;

FIGURES 3 and 4 show enlarged portions of the cable system of FIGURES 1 and 2; and FIGURE 5 shows a valving mechanism for use in the cable system.

In FIGURE 1, a marine cable system is shown being towed from behind a boat 11 with a reel 12, or the like, for storing the cable system on board the boat and for unreeling the cable system into the water. The cable system includes a towing cable 21 and a seismic streamer 15. The seismic streamer consists of a number of active detector sections 15a and at times a number of inactive sections 15b. Various arrangements of buoys, paravanes, etc. may be utilized, of course, to stabilize the streamer during movement of the system through the water.

Referring next to FIGURE 2, the seismic streamer includes a long, cylindrical tube 13 made of a flexible, impervious material such as polyvinyl chloride. Spacers 14 are positioned within the tube at spaced locations to divide the tube into sections such as the alternate active and inactive sections 15a, 15b. The active sections 15a have a plurality of seismic detectors 16 positioned therein. A buoyant fluid such as a light weight petroleum oil (for example, kerosene) is placed in each section to render the section neutrally buoyant in sea water. Valves (not shown) may be provided in the section walls for initially filling the sections with oil. A conductor cable 17 containing a plurality of conductor wires and load-bearing wires is positioned within the system and one or more conductors from the cable are connected to the several detectors 16 in each active section 15a of the streamer. The arrangement of conductors and cable may, for example, be similar to that shown in U.S. Patent No. 2,791,757.

A small, flexible tube 18 is likewise positioned within the larger tube 13, with the smaller flexible tube being connected to flow control valves 19 in each of the cable sections. The small tube 18 and valves 19 comprise an automatic buoyancy control system which provides a means for supplying buoyant fluid or oil under pressure to the individual sections of the cable. The seismic cable system is connected to the towing vessel by means of the towing cable 21 shown in greater detail in FIGURE 3. Towing cable 21 includes the small, flexible tube 18 and conductor cable 17 within a jacket or cover 22. Armor wires, or the like, (not shown) may cover the towing cable. Means (not shown) are provided on board the boat for connecting a pressured oil supply to the tube 18 extending through the towing cable and seismic streamer.

FIGURE 5 shows the details of a flow control valve system 19 which is positioned in each individual section of the streamer. The flexible tubing or conduit 18 branches within each section into a branch conduit 26. The branch conduit 26 supplies fluid to a guard valve assembly 27 and a regulating valve assembly 28.

The regulating valve assembly 28 includes a housing 29 and an air chamber 31 formed by said housing. A diaphragm 32 is positioned within the lower wall of the air chamber 31 and communicates with the oil filled interior of the tubular member 13. An actuating rod 33 is positioned between the diaphragm 32 and one end of a spool valve 34 which, in turn, is slidably positioned within a cylinder or bore 36 formed in the housing 29. The opposite end of the spool valve 34 is connected to a spring 37. The other end of the spring 37 is connected to a screw 38 which, in turn, is mounted on the housing. The screw 38 is rotatable within the housing to adjust the tension of the spring 37.

An annular groove 41 is formed about the periphery of the spool valve midway between its ends. Ports 42, 43 and 44 are formed in the wall of the housing 29. The ports are arranged so that upon movement of the spool valve 34 in an upward direction, ports 42 and 44 are fluidly connected by way of the annular groove 41 in the spool valve. On the other hand, if the spool valve is moved in a downwardly direction, ports 43 and 44 are connected through the annular groove 41. Port 42 in the valve housing is connected with the branch conduit 26 from the main conduit 18. Port 44 in the valve housing 29 is connected with a conduit 46 which communicates with the oil filled interior of the cable section to be controlled by the regulating valve 28. Port 43 in the valve housing is connected with conduit 47 leading to the guard valve assembly 27.

The guard valve assembly 27 includes a housing 51 having a bore 52 therein. A spool valve 53 is slidably positioned within the bore 52, with the upper end of the spool valve having an enlarged head or piston 54 movable within an enlarged portion 56 of the housing bore. A shoulder 57 in the housing bore limits the downward movement of the piston 54 therein. A spring 58 is positioned between the lower side of the piston 54 and a shoulder portion 59 of the housing bore. An annular groove 61 is formed in the spool valve which is effective upon movement of the spool valve to the position shown in FIGURE 5 to connect inlet and outlet ports 62 and 63, respectively, in the guard valve housing 51. The inlet port 62 is connected to the conduit 47 leading from the regulating valve assembly. Outlet port 63 is connected to an exhaust conduit 64 which extends to the exterior of the large tube 13. Upon movement of the spool valve to an upward position, the inlet and outlet ports 62 and 63, respectively, are isolated from one another to close the exhaust line 64 from communication with conduit 47.

In the operation of the above-described apparatus, the seismic system shown in FIGURE 1 is paid out from the reel 12 into the water behind the towing vessel. During a seismic survey various factors affect the density of the sections of the cable assembly and the density of the water. For example, small leaks in the cable sections, and temperature and salinity changes in the water produce such variations. The previously described valve mechanism and fluid supply system are operative to automatically adjust the density of the cable system and thereby maintain the cable system at the constant depth of the leading end of the cable.

Such automatic adjustment of the cable is accomplished by supplying buoyant fluid under pressure to the small, flexible tube 18 by means of a pump or the like on the deck of the vessel 11. If the salinity of the water were to decrease as at the mouth of a river, that portion of the cable in the less saline water will tend to drop within the water thereby increasing the depth of that section of the cable. The increase in depth results in an increase in hydrostatic pressure on the cable which increase is transmitted through the plastic skin of the cable tube 13 into the oil filled interior of the cable. The increase in pressure of the oil within the cable acts upon the diaphragm 32 of the regulating valve to move the diaphragm against the air within the chamber 31. This movement of diaphragm 32 causes the spool valve 34 to move upwardly within bore 36 on the valve housing. Such positioning of the spool valve 34 connects the groove 41 with ports 42 and 44 which, in turn, places the branch fluid supply conduit 26 in communication with the conduit 46 connecting to the interior of the cable section. Since the buoyant fluid or oil in branch line 26 is under a greater pressure than the interior of the cable section, additional oil is pumped into the interior of the section which, in turn, increases its buoyancy within the water and thereby raises the cable section toward the surface. As the section of cable rises, the hydrostatic pressure acting upon the diaphragm 32 decreases thereby moving the spool valve back down to the neutral position as shown in FIGURE 5.

It is readily seen that the reference position of the spool valve may be adjusted such as by means of the screw 38 which attaches to one end of the retarding spring. Likewise, variation in the spring rate or in the pressure of chamber 31 will change the neutral position of the spool valve. By means of such adjustment, the valve may be positioned in any infinite number of positions so that the optimum depth of the cable may be controlled. This optimum or towing depth would be adjusted at the surface before the cable system is placed in the water. Although not shown, indicia may be provided on the adjusting device to provide a convenient means for determining the relative adjustment of the valve and the resulting optimum cable depth for which the valve mechanism is adjusted.

It is readily seen that in the operation of the valve mechanism, if the cable assembly were to rise above the selected towing depth, pressure in the air chamber 31 would be effective to move the spool valve 34 downwardly within the valve housing and thereby connect ports 43 and 44. This, in turn, would connect the interior of the cable section with the conduit 47 which, as it will be shown, is normally in communication with exhaust conduit 64 thereby permitting oil to escape from the cable section into the sea. The buoyant fluid or oil which originally fills the cable sections may be maintained under pressure by filling the cable section with a sufficient volume of oil to stretch the tube 13. Therefore, upon communication of valve ports 43 and 44, the stretched tubing of the cable section would force oil from the section through the exhaust conduits 47 and 64. Additionally, the removal of oil from a cable section would be facilitated by the movement of the cable within the water. With the end of the exhaust conduit 64 pointing toward the trailing end of the cable system, the movement of the cable would tend to cause a reduction in pressure at the trailing end of the exhaust conduit which, in turn, would draw oil from the section. A check valve (not shown) can be inserted in the end of conduit 64 to prevent the flow of sea water into the conduit.

It is readily seen that when the seismic cable system is removed from the water and stored on the boat deck or on the reel, the regulating valve 28, sensing a decrease in pressure on the cable, will move the spool valve 34 to a position aligning ports 43 and 44 which will permit oil to be jettisoned from the cable sections. The guard valve 27 is provided in the system to prevent the oil from discharging from the cable system during such a condition. The guard valve 27 operates as follows: Pressure is applied to fluid in the main conduit 18 only when the cable system has been launched and is being towed. Therefore, fluid pressure is applied to the top of piston 54 in the guard valve when pressure is being maintained on the main conduit 18. This pressure on the piston 54 moves the piston against the force of the spring 58 to bring the recess 61 in spool valve 53 into alignment with ports 62, 63 and thereby place the ports in communication. Therefore, during operation of the cable system, when pressure is applied to fluid in conduit 18, the guard valve is operative to open the exhaust conduit 64 and thereby permit the discharge of buoyant fluid from the cable system. However, prior to retrieving the cable system aboard the vessel, the pump pressure on the fluid in conduit 18 is discontinued. The subsequent decrease in pressure allows the spring 58 to urge the piston 54 in an upwardly direction. Such upward movement of piston 54 shifts the spool valve to a position to disconnect the ports 62, 63 from fluid communication. This disconnection of the ports 62 and 63 closes the exhaust line 64 to prevent the discharge of fluid from the cable section under such conditions.

It is appreciated that various and more complicated devices could be provided for regulating the buoyancy of a cable such as by having pressure transducers in each section controlling electrically operated pumps and valves to increase and decrease the amount of oil supplied to a cable section. However, the system disclosed herein provides a simple and effective method for automatically regulating the buoyancy of a cable. Thus, while a particular embodiment of the present invention has been shown and described, it is apparent that changes and modifications may be made without departing from this invention in its broader aspects and, therefore, the aim in the appended claims is to cover all such changes and modifications as fall within the true spirit and scope of this invention.

What is claimed is:

1. A marine cable system comprising: a streamer adapted to be towed through water behind a boat; and means for varying the buoyancy of said streamer in response to changes in the depth of said streamer within the water, said varying means including a first conduit for supplying buoyant fluid under pressure to said streamer, a second conduit for discharging buoyant fluid from said streamer, valve means for opening and closing said second conduit, and means responsive to the pressure of buoyant fluid in said first conduit for operating said valve means.

2. Apparatus for use in varying the buoyancy of a section of cable in a marine cable system comprising: first conduit means for supplying buoyant fluid to the section of cable; second conduit means for discharging buoyant fluid to the exterior of said section of cable; first valve means for opening and closing both of said conduit means; means responsive to hydrostatic pressure for operating said first valve means; second valve means for opening and closing said second conduit means; and means responsive to the pressure of buoyant fluid in said first conduit means for operating said second valve means.

3. In a marine seismic exploration system, the combination comprising: an elongated hollow streamer cable adapted to be towed behind a boat and having a plurality of isolated sections each containing a buoyant fluid; and means for independently varying the buoyancy of each isolated section in response to changes in depth of said sections within the water, said varying means including first conduit means for supplying buoyant fluid under pressure to all said sections, second conduit means for discharging buoyant fluid from each of said sections, valve means for opening and closing said second conduit means, and means responsive to the pressure of buoyant fluid in said first conduit means for operating said valve means.

4. In a marine seismic exploration system, the combination comprising: an elongated hollow streamer cable adapted to be towed behind a boat and having a plurality of isolated sections each containing buoyant fluid; first conduit means for supplying buoyant fluid to each section of cable; second conduit means in each respective section for discharging buoyant fluid to the exterior of the sections; first valve means within each section for opening and closing both of said conduit means; means responsive to hydrostatic pressure for operating said first valve means; second valve means within each section for opening and closing said second conduit means, and means responsive to the pressure of buoyant fluid in said first conduit means for operating said second valve means.

References Cited

UNITED STATES PATENTS

| | | | |
|---|---|---|---|
| 1,358,360 | 11/1920 | Burney | 114—235 |
| 1,373,329 | 3/1921 | Hoar | 114—16 |
| 2,359,366 | 10/1944 | Katcher et al. | 114—235 |
| 2,371,404 | 3/1945 | Mumford | 114—235 |
| 2,632,150 | 3/1953 | Silverman et al. | 181—0.5 |
| 2,791,757 | 5/1957 | Blake et al. | 340—7 |
| 2,928,367 | 3/1960 | McCormick | 340—3 |
| 3,228,369 | 1/1966 | Warhurst et al. | 114—16 |
| 3,301,209 | 1/1967 | Caldwell | 114—16 |

SAMUEL FEINBERG, *Primary Examiner.*

BENJAMINN A. BORCHELT, *Examiner.*

W. KUJAWA, *Assistant Examiner.*